United States Patent [19]
Franklin et al.

[11] 4,338,349
[45] Jul. 6, 1982

[54] REINCORPORATION OF COCOA AROMA

[75] Inventors: James G. Franklin, Morges;
Bernhard Rütter, St. Erhard, both of
Switzerland

[73] Assignee: Societe d'Assistance Technique pour
Produits Nestle S.A., Lausanne,
Switzerland

[21] Appl. No.: 177,469

[22] Filed: Aug. 12, 1980

[51] Int. Cl.³ .............................................. A23G 1/00
[52] U.S. Cl. ..................................... 426/631; 426/59;
426/386; 426/459; 426/285
[58] Field of Search ................. 426/631, 96, 103, 593,
426/386, 456, 459, 285, 650, 651

[56] References Cited
U.S. PATENT DOCUMENTS

| 3,027,257 | 3/1962 | Schenkenberg | 426/593 |
| 3,418,134 | 12/1968 | Rooker | 426/386 |
| 3,715,216 | 2/1973 | Wuhrmann et al. | 426/285 |
| 3,966,975 | 6/1976 | Hansen et al. | 426/285 |
| 4,156,030 | 5/1979 | Eggen | 426/650 |

Primary Examiner—Raymond N. Jones
Assistant Examiner—Elizabeth J. Curtin
Attorney, Agent, or Firm—Vogt & O'Donnell

[57] ABSTRACT

A process for producing a cocoa powder mix characterized in that immediately before agglomeration, a dilute aqueous solution of cocoa aroma is sprayed onto a ground cocoa powder mixture in an amount below that which would impair the free flowing properties of the powder, after which the powder is agglomerated using steam or water and then dried.

4 Claims, No Drawings

REINCORPORATION OF COCOA AROMA

The present invention relates to a method of reincorporating cocoa aroma into a cocoa powder mix.

Cocoa powder is obtained from cocoa beans which are first cleaned and roasted and after being cooled, they are cracked and winnowed to remove germs and shells. The shell free edible part of the beans is known as the nib which contains about 55% fat (cocoa butter) and this is then ground to produce a chocolate liquor. Cocoa butter is then extracted from hot, finely ground chocolate liquor by means of hydraulic pressure until the required residual fat is obtained. The resulting pressed cake is then disintegrated and pulverised with cooling and sifting until the size of the particles is the same as it was in the liquor before being compacted in the press to produce the cocoa powder.

The cocoa aroma may be obtained from any conventional source. For example it may be extracted from cocoa beans or it may be an artificial aroma.

Cocoa powder may be used to prepare chocolate drinks, desserts, ice creams, cakes, creams and puddings.

A cocoa beverage powder mix from which a chocolate drink may be made usually contains from 2% to 25% cocoa, 0.5% to 2% lecithin, up to 0.1% vanilla, up to 0.1% cinnamon, up to 1% salt, all or most of the remainder being made up of sugar or a filler such as malto-dextrine or a mixture of sugar and filler. Optionally, small quantities of other ingredients such as thickening agents, colouring agents, flavouring agents, skimmed or whole milk powder, or fats may be included to alter flavour profile or improve convenience.

Such a powder mix may be prepared by lecithinising sugar and grinding thoroughly, adding salt, vanilla and cinnamon to the mixture followed by grinding to a uniform particle size, then adding the cocoa powder and finally mixing thoroughly.

Powdered materials, especially those used in the food industry, are often agglomerated to enhance their appearance and performance. For example a cocoa beverage powder mix may be agglomerated to improve its solubility in cold milk.

Although there are several conventional techniques by which one could add a cocoa aroma to the powder mix, they must be performed before the final grinding of the dry mix. During the grinding the powder is exposed to high temperature, which is detrimental to the volatile cocoa aroma.

If the cocoa aroma is blended with anhydrous glucose before incorporating into the powder mix, the blending process and subsequent handling give increased opportunities for aroma loss.

U.S. Pat. No. 3,729,327 describes the agglomeration of coffee powder using steam and describes a method of improving the flavour and/or aroma of the agglomerated coffee products by introducing small amounts of coffee aromas into the steam vapour zone.

We have found surprisingly that when a cocoa powder mix is agglomerated using either steam or water, the taste of a cocoa product prepared from an agglomerated and dried powder mix in which the aroma was sprayed on in the form of a dilute aqueous solution immediately before agglomeration is superior to the taste of a cocoa product prepared from an agglomerated and dried powder mix in which the aroma was added at any other position in the process line including during agglomeration.

Accordingly the present invention provides a process for producing a cocoa powder mix characterised in that immediately before agglomeration, a dilute aqueous solution of cocoa aroma is sprayed onto a ground cocoa powder mixture in an amount below that which would impair the free flowing properties of the powder, after which the powder is agglomerated using steam or water and then dried.

Preferably the cocoa powder mix is a cocoa beverage powder.

The cocoa aroma is normally obtained as an aqueous solution containing 3,000 to 4,000 ppm by weight of cocoa aroma.

The amount of aroma sprayed onto the powder may conveniently be from 0.05% to 5% by weight, preferably 0.15% to 1.0% by weight and especially 0.25% to 0.50% by weight based on the weight of cocoa in the powder. Such amounts may be achieved by spraying on the aqueous solution of aroma at a controlled rate sufficient to wet the particles but less than the amount which would destroy the free flowing properties of the powder.

The temperature at which the aqueous solution of aroma is sprayed on to the powder should be as low as possible, preferably not more than 25° C. Preferably the aqueous solution of aroma is kept at as low a temperature as practical, for instance from 1° to 25° C.

The equipment used may be any conventional spray for example with a 2-fluid nozzle.

After the aqueous solution of the aroma has been sprayed on, the powder mix is agglomerated and then dried by conventional means. It is thought that the agglomeration steam or water 'wets' the surface of the particles coated with aqueous aroma and incorporates the aroma within the agglomerated particles.

The following examples further illustrate the present invention.

EXAMPLE 1

A cocoa beverage powder mix containing 18.6 parts of cocoa powder, 80.0 parts sugar, 1.0 part lecithin, 0.06 part vanilla, 0.03 part cinnamon and 0.3 part salt was fed continuously into an agglomeration nozzle on top of a drying tower. Immediately before the powder fell by gravity into the agglomeration nozzle an aqueous solution containing 3,500 ppm by weight of cocoa aroma (measured as total organic carbon) was sprayed onto the curtain of falling powder at a precisely controlled rate so that 0.40% by weight of aroma based on the weight of cocoa was incorporated onto the powder mix. The aroma coated powder then fell into the agglomeration nozzle where the surface of each particle was "wetted" with steam and the powder particles stuck together. They then fell into the drying tower where the excess moisture was evaporated in a turbulent flow of hot dry air to give the final dry agglomerated cocoa powder mix.

EXAMPLE 2

A similar procedure to that described in Example 1 was followed except that the aroma was sprayed onto the curtain of falling powder at a rate so that 0.27% by weight of aroma based on the weight of cocoa was incorporated onto the powder mix.

EXAMPLE 3

A similar procedure to that described in Example 1 was followed except that the aroma was sprayed onto the curtain of falling powder at a rate so that 0.50% by weight of aroma based on the weight of cocoa was incorporaed onto the powder mix.

COMPARATIVE EXAMPLE A 0.69 part of glucose containing 10% cocoa aroma was mixed with 76.4 parts of sucrose and lecithinised with 1.09 parts lecithin. 0.32 part salt, 0.07 part vanilla and 0.03 part cinnamon were added to the mixture and it was then ground to a uniform particle size. 21.33 parts of cocoa powder were added and mixed. The powder was subsequently agglomerated and dried to give a chocolate powder mix.

A panel of 8 tasters unanimously preferred a chocolate drink prepared from a powder mix of Examples 1 to 3 of the present invention to one prepared from the powder mix of Comparative Example A.

COMPARATIVE EXAMPLE B

A similar procedure to that described in Example 1 was followed except that the cocoa aroma was mixed with the steam and applied in the agglomeration nozzle instead of being applied immediately before the powder fell into the agglomeration nozzle.

A panel of tasters unanimously preferred a chocolate drink prepared from a powder mix of Examples 1 to 3 of the present invention to one prepared from the powder mix of Comparative Example B.

We claim:

1. A process for producing an aromatized agglomerated cocoa mix which comprises the steps of:
   (a) forming a ground cocoa powder mixture;
   (b) spraying a dilute aqueous solution of cocoa aroma onto the mixture in an amount below that which would impair its free flowing properties, immediately prior to the next step of agglomeration means of steam or water; and then
   (c) agglomerating the mixture by
   (d) drying the agglomerated aromatized cocoa powder mixture.

2. A process according to claim 1, wherein the cocoa powder mix is a cocoa beverage powder.

3. A process according to claim 1, wherein the amount of aroma sprayed onto the powder is from 0.15% to 1.0% by weight based on the weight of cocoa in the powder.

4. A process according to claim 1, wherein the dilute aqueous solution of cocoa aroma is sprayed onto the ground cocoa powder mixture at a temperature of not more than 25° C.

* * * * *

UNITED STATES PATENT AND TRADEMARK OFFICE
CERTIFICATE OF CORRECTION

PATENT NO. : 4,338,349
DATED : July 6, 1982
INVENTOR(S) : James G. Franklin and Bernhard Rutter It is certified that error appears in the above—identified patent and that said Letters Patent is hereby corrected as shown below:

```
Claim 1, line 6, "flowing properties, immediately"
        should read -- flowing properties immediately --.
```

Signed and Sealed this

Thirty-first Day of August 1982

[SEAL]

Attest:

GERALD J. MOSSINGHOFF

Attesting Officer

Commissioner of Patents and Trademarks